Feb. 21, 1967     D. R. McGREGOR     3,305,615
PROCESS AND APPARATUS FOR FLATTENING
EXTRUDED CYLINDRICAL NET
Filed Dec. 10, 1963
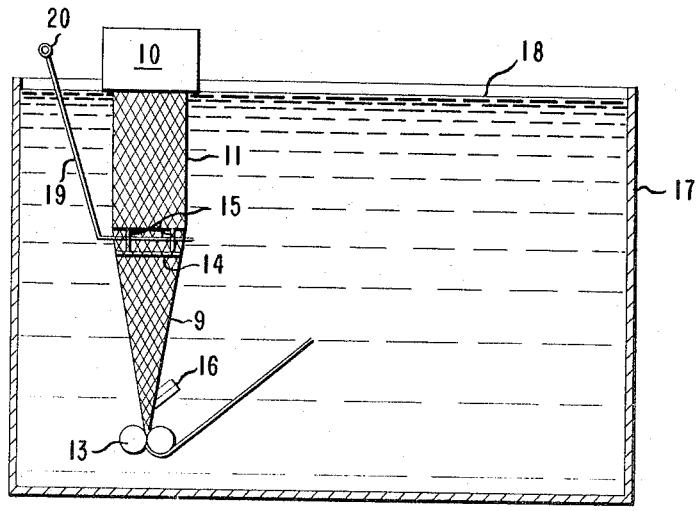
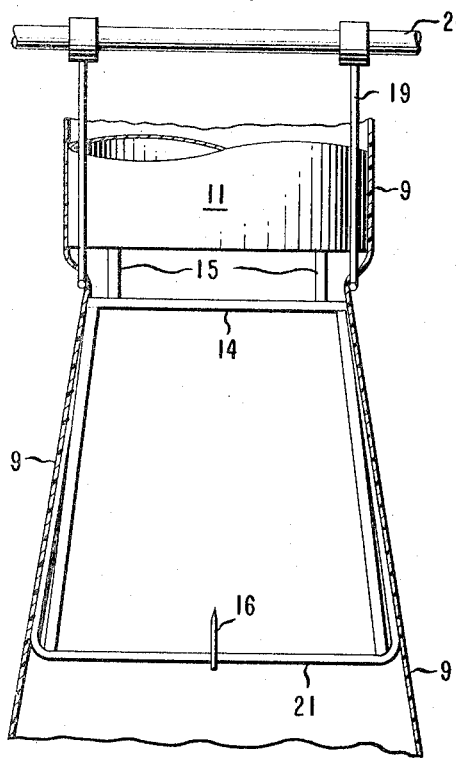
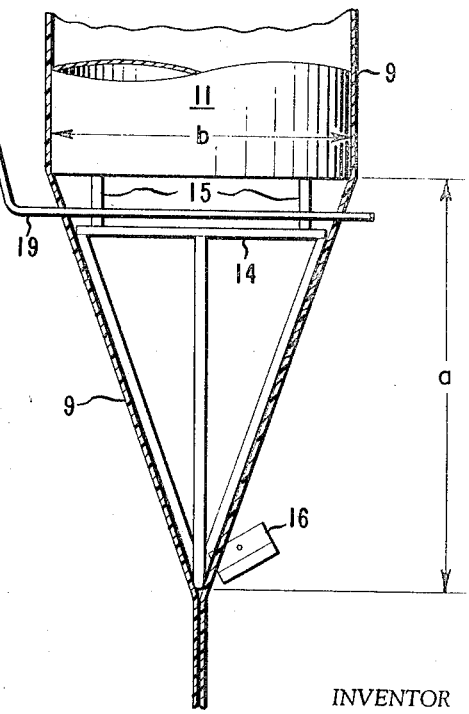
INVENTOR
DONALD ROSS McGREGOR
BY    *Robert W Black*
ATTORNEY

United States Patent Office 3,305,615
Patented Feb. 21, 1967

3,305,615
PROCESS AND APPARATUS FOR FLATTENING
EXTRUDED CYLINDRICAL NET
Donald Ross McGregor, Williamsville, N.Y., assignor to
E. I. du Pont de Nemours and Company, Wilmington,
Del., a corporation of Delaware
Filed Dec. 10, 1963, Ser. No. 329,455
4 Claims. (Cl. 264—145)

This invention relates to the manufacture of thermoplastic netting, and more particularly to improved processes and apparatus for converting extruded continuous tubular netting to the flattened state.

In the manufacture of tubular thermoplastic netting for shelf liners and other flat products, a problem occurs when the tubular netting must be collapsed to a "lay-flat" condition. Ripples are present in the flat netting which are caused by differences in the lengths of part of the material when quenched. These differences are caused by the differences in distances the tubing must travel as it is collapsed to a "lay-flat" condition. The resulting ripples are objectionable for the above and many other uses, and cannot be removed after manufacture of the netting.

It is, therefore, an object of this invention to provide an improved process and apparatus for converting extruded continuous tubular netting to the flattened state which eliminates ripples.

A further object of this invention is to provide a simple and economical apparatus for preventing ripples when tubular netting is converted to the flattened state by causing all elements of the netting to travel substantially the same distance over the former to the nip rolls. These and other objects will appear hereinafter.

These and other objects of the present invention are accomplished by the improved process having the steps of continuously forming a tubular netting of thermoplastic polymeric material, said netting having a circular cross section; continuously converting the netting to a flattened condition consisting solely of two plies of netting over the entire width of the netting; continuously converting the netting from the circular cross section to an essentially square cross section by suitable square former means; the periphery of said essentially square cross section being substantially equal to that of the circular cross section, the line connecting the midpoints of two opposite sides of the square being parallel to the line perpendicular to the longitudinal axis of the netting at which line the netting attains a flattened condition and continuously slitting the netting to form at least one flat sheet of netting, the improvement comprising: pressing said tubular netting intermediate said circular cross section and said square cross section to hold said netting against the sides of said square former means thereby causing all elements of said netting to travel substantially the same distance over said square former means.

The process of the present invention is generic to the collapsing of any tubular thermoplastic polymeric netting from a circular cross section to a "lay-flat" condition without regard to (1) the specific means by which the tubular netting is produced; (2) whether or not the tubular netting is stretched; and (3) whether the netting is to be slit once, opened and then wound up as a single flat net or slit twice and wound on a plurality of cores.

The invention will be described hereinafter, reference being had to the accompanying drawings, herein:

FIGURE 1 is a fragmentary general elevation view of an extrusion machine haul off mechanism for the tubular extruded netting;

FIGURE 2 illustrates a front elevation showing flatness rods in conjunction with the circular and square formers; and, FIGURE 3 is a side elevation of FIGURE 2.

Appropriate setting or fixing means and haul off apparatus are exemplified in FIGURE 1 with respect to the annular extrusion method. The extruded tubular netting 9 as it emerges from the die 10 is drawn over a vertical cylindrical former 11 calculated to maintain the diameter of the tubular netting while setting and to insure an even haul off. At this point the netting has a circular cross section.

As the netting is advanced by rollers 13 (drive not shown), its cross sectional shape is changed from a circle, as it is drawn over the cylindrical former, to a square having essentially the same periphery as the circle, by drawing the netting over square former 14 supported internally of the tubular netting by supports 15 attached to the cylindrical former which is, in turn, supported by the core of the annular die 10. The bottom bar 21 of the square former, at which point the tubular netting becomes flat, has a length one-half the circumference of the tubular netting. The ratio $a/b$ of (a) the distance between the bottom of the cylindrical former and the line at which the tubular netting becomes flat (bottom bar 21) to (b) the diameter of the cylindrical former is at least 2:1 and preferably ranges from 2:1 for fine netting to 3:1 or greater for stiff netting, although a 2:1 ratio can be employed with stiff netting if more pressure is exerted by the flatness rods. The square former, having a perimeter equal to the circumference of the cylindrical former, is situated at a distance from the cylindrical former such that the sides which are parallel to the bottom bar 21 (where the tubing becomes flat) are in line with that bar and the outermost points of the circle on the cylindrical former above the midpoint of the bar. (See FIGURE 3.) In other words, the square former is at a distance of about $0.22a$ from the circular former.

If a finally flat netting is required, it is convenient to mount a cutting or slitting wheel or blade 16 below the square former 14 and just above rollers 13. Of course, the netting can be slit at other points past the square former.

The setting or fixation is conveniently accomplished by immersing the netting in a coolant as it is extruded. The above-described haul off mechanism is, therefore, located in a coolant tank 17, the level of the liquid indicated at 18.

Mutually parallel flatness rods 19 are suspended in the coolant tank 17 from a pivot shaft 20. The rods are positioned just above the square former on opposite sides just enough pressure to hold the netting against the sides of the tubular netting and press against the netting with of the square former from which the netting otherwise tends to separate. The rods are provided with screw adjustment means on the pivot shaft for moving them laterally toward and away from the netting.

It is the combination of placing the square former at about $0.22a$, i.e., 0.22 times the distance between the bottom of the cylindrical former and the line at which the tubular netting becomes flat, the pressure of the flatness rods against the netting intermediate the cylindrical former and square former and wherein the ratio of (a) the distance between the bottom of the cylindrical former and the line at which the netting becomes flat to (b) the diameter of the circular cross section is at least 2:1 which provides the beneficial results of the present invention.

Extrusion of the tubular netting is carried out in a normal fashion, for example, as described and shown in U.S. Patent 2,919,467, using the above-described apparatus. The cutting knife or wheel is moved into position so that the netting is being cut, opened into a flat sheet and wound up.

The flatness rods are adjusted into the approximate positions shown in FIGURE 2. After the portion of the netting which has been so pressed by the flatness rods has reached the wind-up roll, a piece of the flat netting is removed and checked for ripples. If the edges and/or middle of the sample sheet are rippled when lying on a flat surface (i.e., the edges resulting from the longitudinal cutting of the tubing when cut in the position shown in FIGURE 2), the rods are moved laterally toward the centerline of the apparatus until the defect in the flat sheet is corrected. If ripples appear at about one-fourth of the distance across the netting, from either edge or both, the pressure of the rods is too great and one or both should be moved away from the centerline. One rod can be moved if flatness needs to be improved on one side only.

Stiff tubular netting may not respond satisfactorily to the above adjustments. In this case, the problem is easily solved by a simple extension of the same principle. A second pair of mutually parallel flatness rods (not shown) perpendicular to primary flatness rods 19 is used to control the travel distance on the sides of the square former where the netting sometimes bulges as a result of the pressure of the primary rods. This bulging of stiff tubing is accentuated by smaller ratios of former length to diameter and relieved by larger ratios as shown above.

By use of the apparatus and process of the present invention, all elements of a tubular net travel substantially the same distance over the former to the nip rolls. In this manner, flat netting can be manufactured in long pieces which can be wound onto large rolls for storage and shipping and then cut for use on flat surfaces where any rippling is objectionable.

What is claimed is:

1. In a process having the steps of continuously forming a tubular netting of thermoplastic polymeric material, said netting having a circular cross section formed by a circular former; continuously converting the netting to a flattened condition consisting solely of two plies of netting over the entire width of the netting; continuously converting said netting from the circular cross section to an essentially square cross section by suitable square former means, the periphery of said essentially square cross section being substantially equal to that of the circular cross section, the line connecting the midpoints of two opposite sides of the square being parallel to the line perpendicular to the longitudinal axis of the netting at which line the netting attains a flattened condition and continuously slitting the netting to form at least one flat sheet of netting, the improvement comprising: placing said square former means at about 0.22 times the distance between the bottom of the circular former and the line at which the tubular netting becomes flat and wherein the ratio of (a) the distance between the bottom of the cylindrical former and the line at which the netting becomes flat to (b) the diameter of the circular cross section is at least 2:1, pressing said tubular netting intermediate said circular cross section and said square cross section to hold said netting against the sides of said square former means thereby causing elements of said netting to travel substantially the same distance over said square former means.

2. In apparatus for manufacture of netting having cylindrical means for continuously forming a continuous self-supporting tubing of netting of thermoplastic polymeric material having a circular cross section; means for continuously converting said tubing to a flattened condition consisting solely of two plies of netting over the entire width of said flattened netting; former means adapted to continuously convert said netting from the circular cross section to an essentially square cross section prior to converting said netting to the flattened condition, the periphery of the square cross section being substantially equal to that of the circular cross section, the line bisecting two opposite sides of the square being parallel to the line perpendicular to the longitudinal axis of the netting where the netting becomes flat, the improvement comprising: at least one pair of parallel rods perpendicular to the line at which the netting becomes flat, said rods positioned intermediate said cylindrical forming means and said square former means outside and against said netting and the rods of each pair being on opposite sides of said netting, the ratio of (a) the distance between the bottom of the cylindrical former and the line at which the netting becomes flat to (b) the diameter of the circular cross section being at least 2:1, the distance between the bottom of the cylindrical former and the square former being 0.22 times the distance between the bottom of the cylindrical former and the line at which the netting becomes flat and means for moving said rods laterally against said tubular netting.

3. The apparatus of claim 2 wherein the ratio of (a) the distance between the bottom of the cylindrical former and the line at which the netting becomes flat to (b) the diameter of the circular cross section is within the range of about 2:1 to 3:1.

4. The apparatus of claim 3 wherein an additional pair of rods is positioned perpendicular to the first pair and parallel to the line at which the netting becomes flat.

References Cited by the Examiner

UNITED STATES PATENTS

| | | | |
|---|---|---|---|
| 2,720,680 | 10/1955 | Gerow | 264—209 |
| 2,848,747 | 8/1955 | Dixon | 264—209 |
| 3,084,386 | 4/1963 | Gerow | 264—209 |
| 3,178,328 | 4/1965 | Tittian | 264 |

ROBERT F. WHITE, *Primary Examiner.*

R. R. KUCIA, *Assistant Examiner.*